United States Patent
Sumi

(10) Patent No.: US 7,539,406 B2
(45) Date of Patent: May 26, 2009

(54) CAMERA, LENS DRIVING METHOD, AND LENS DRIVING PROGRAM

(75) Inventor: Hidetoshi Sumi, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 477 days.

(21) Appl. No.: 11/314,911

(22) Filed: Dec. 21, 2005

(65) Prior Publication Data

US 2006/0140607 A1    Jun. 29, 2006

(30) Foreign Application Priority Data

Dec. 27, 2004   (JP)   ............... 2004-378274

(51) Int. Cl.
  *G03B 17/00*  (2006.01)
  *G02B 15/14*  (2006.01)

(52) U.S. Cl. .............. 396/79; 359/696; 348/240.3; 348/347

(58) Field of Classification Search ............. 396/79–83, 396/303; 348/240.3, 347; 359/696–698
See application file for complete search history.

(56) References Cited

U.S. PATENT DOCUMENTS 6,144,805 A * 11/2000 Ogino ................ 396/81
6,163,341 A * 12/2000 Kawaguchi et al. ......... 348/357

FOREIGN PATENT DOCUMENTS

JP    6-62300 A    3/1994

* cited by examiner

*Primary Examiner*—W. B. Perkey
(74) *Attorney, Agent, or Firm*—Frishauf, Holtz, Goodman & Chick, P.C.

(57) ABSTRACT

A camera is provided with a first stepping motor configured to move a zoom lens, second stepping motor configured to move a focus lens, first determination section configured to determine timings at which the zoom lens or the focus lens is started, second determination section configured to determine whether or not the zoom lens and the focus lens are to be simultaneously moved, by checking the timings the first determination section determines, timing setting section configured to synchronize output timings of excitation signals output to the first and second stepping motors, where the second determination section determines that the zoom lens and the focus lens are to be simultaneously moved, and an output section configured to output excitation signals to the first and second stepping motors in accordance with the output timings the timing setting section synchronizes.

15 Claims, 12 Drawing Sheets

FIG.4
(4a) ZOOM MOTOR
(1-2) PHASE DRIVING
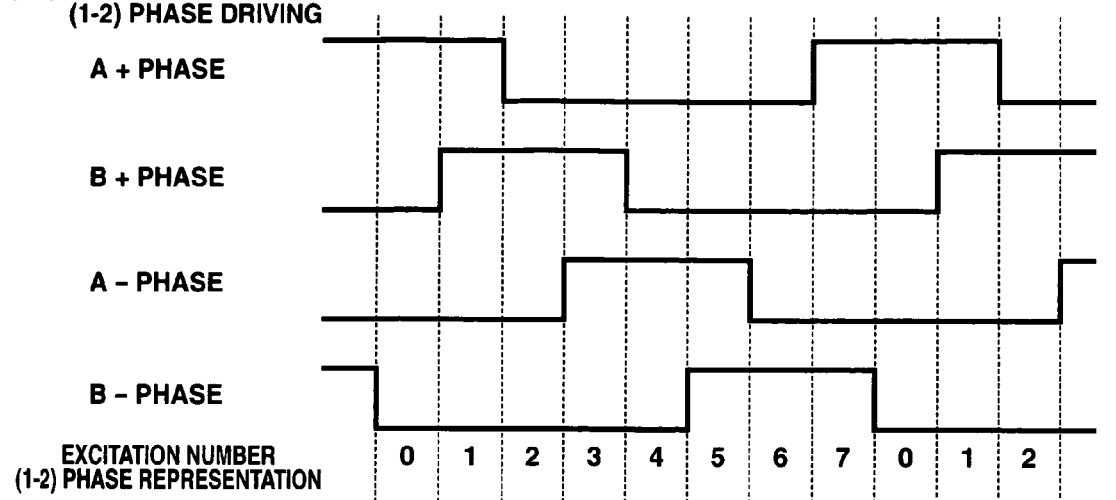
(4b) FOCUS MOTOR
(1-2) PHASE DRIVING
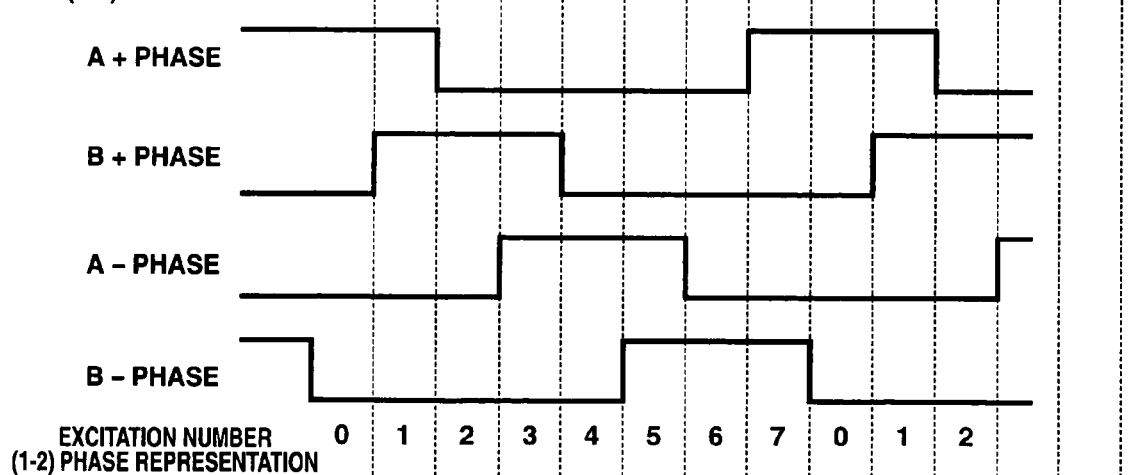
(4c)
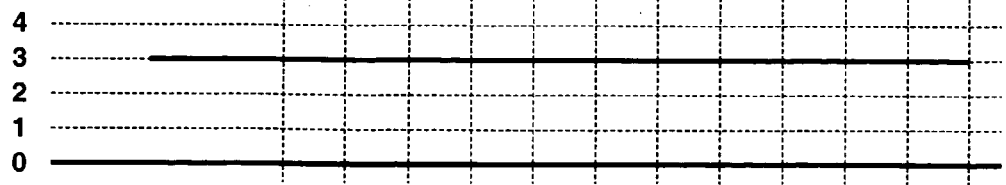
CURRENT RATIO (SINGLE-PHASE CURRENT OF (1-2) PHASE IS USED AS A REFERENCE)

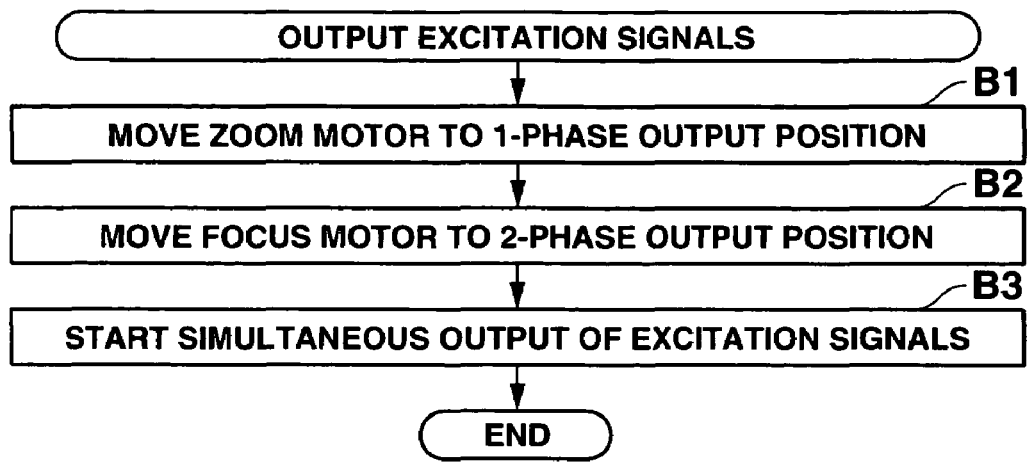
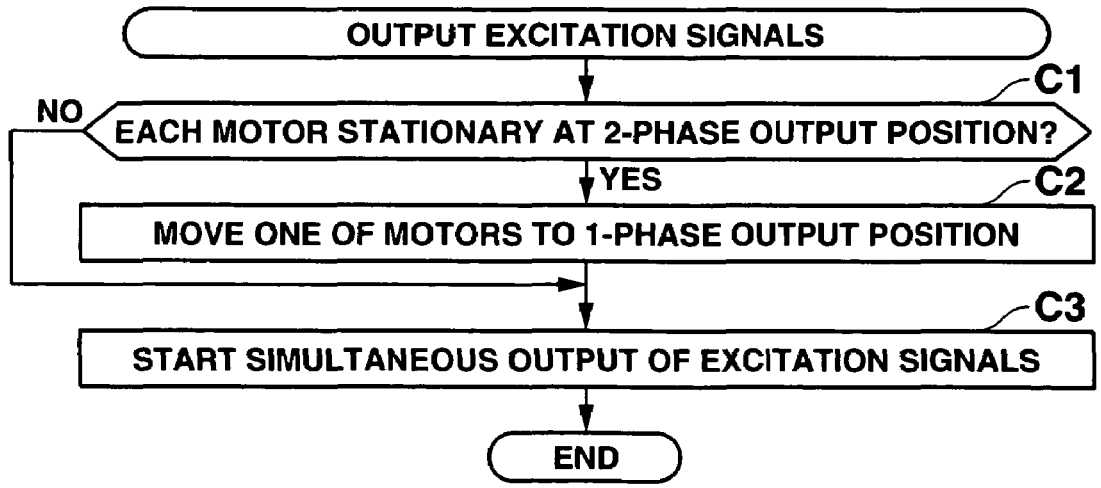

FIG.11
(11a) INITIALIZATION TIMING CHART
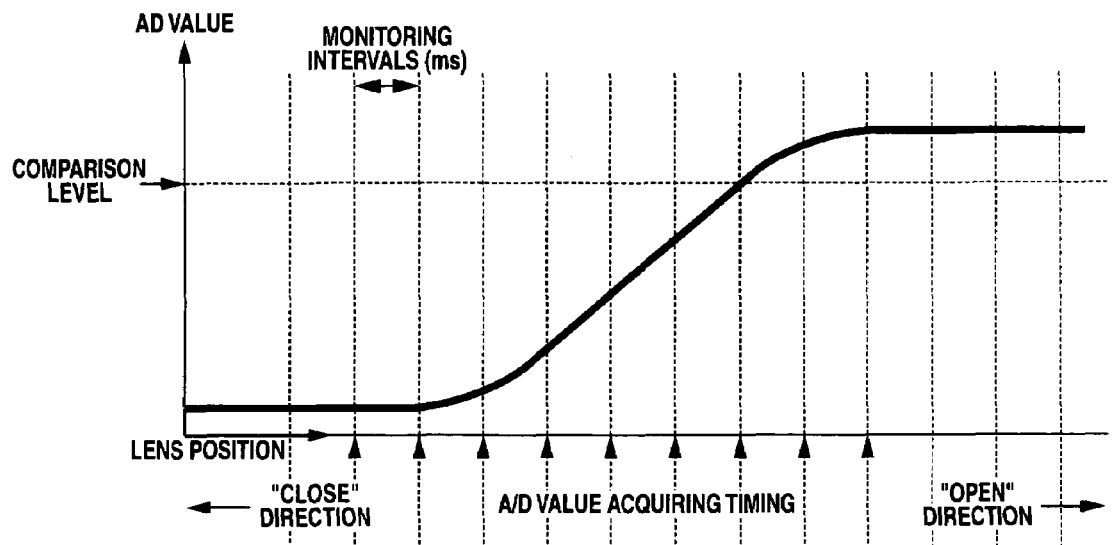
(11b) FOCUS LENS DRIVING OUTPUT
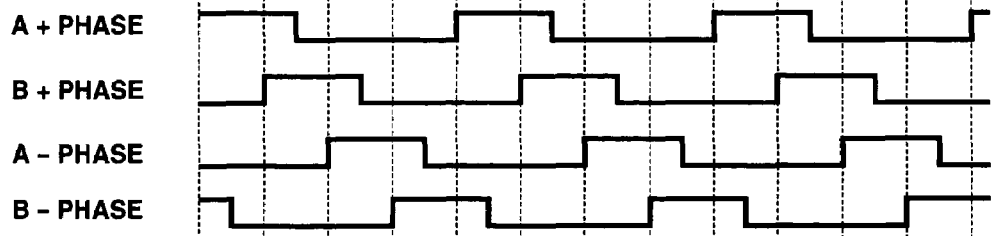
(11c) ZOOM LENS DRIVING OUTPUT
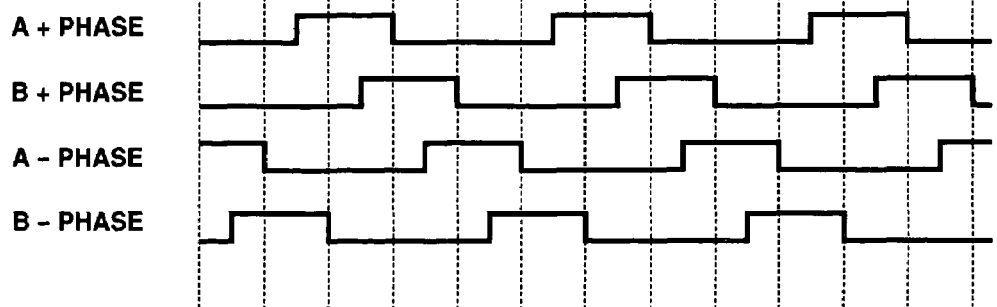

CAMERA, LENS DRIVING METHOD, AND LENS DRIVING PROGRAM

CROSS-REFERENCE TO RELATED APPLICATIONS

This application is based upon and claims the benefit of priority from prior Japanese Patent Application No. 2004-378274, filed Dec. 27, 2004, the entire contents of which are incorporated herein by reference.

BACKGROUND OF THE INVENTION

1. Field of the Invention

The present invention relates to a camera and a lens driving method, wherein stepping motor drives a zoom lens and a focus lens.

2. Description of the Related Art

In an electronic camera such as a digital still camera, a zoom tracking operation has to be performed wherein a focus lens is moved in accordance with the movement of a zoom lens. By this operation, the zoom lens and the focus lens are kept driven in accordance with the zoom operation, so that an object to be photographed can be in focus even when the angle of view (i.e., the magnification) of the camera is changed.

In the zoom tracking operation, the focus lens has to be moved to the focus position corresponding to the zoom position so that the same object can be kept in focus before and after the zoom operation. In order to maintain the in-focus state of the focus lens during the zoom operation, the zoom tracking operation has to be performed in such a manner that the position of the focus lens and the position of the zoom lens has such relationships as shown in FIG. 2, for example.

In a conventional lens control device for driving two lenses, the speed at which the magnifying lens is moved is smoothly controlled for maintaining the in-focus state. An example of such a conventional lens control device is disclosed in Jpn. Pat. Appln. KOKAI Publication No. 6-62300, for example.

In the lens control device described in Jpn. Pat. Appln. KOKAI Publication No. 6-62300, the microcomputer for lens control can control the stepping motor (zoom motor) in such a manner as to change the moving speed of the magnifying lens, if the moving speed of the focus compensation lens exceeds a preset value when the magnifying lens is moving.

BRIEF SUMMARY OF THE INVENTION

Accordingly, an object of the present invention is to prevent a peak current value from becoming high when both a zoom lens and a focus lens are driven simultaneously.

According to an aspect of the present invention, there is provided a camera comprising: a first stepping motor configured to move a zoom lens; second stepping motor configured to move aw focus lens; first determination section configured to determine timings at which the zoom lens or the focus lens is started; second determination section configured to determine whether or not the zoom lens and the focus lens are to be simultaneously moved, by checking the timings the first determination section determines; timing setting section configured to synchronize output timings of excitation signals supplied to the first and second stepping motors, where the second determination section determines that the zoom lens and the focus lens are to be simultaneously moved; and an output section configured to supply excitation signals to the first and second stepping motors in accordance with the output timings the timing setting section synchronizes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is an excitation timing chart illustrating how the focus motor 23 and the zoom motor 24 are excited.

FIGS. 5A and 5B are flowcharts illustrating how excitation signals are output when the excitation is started (resumed) in the embodiment.

FIG. 11 illustrates sensor value-acquisition timing used in the initializing processing of the embodiment.

DETAILED DESCRIPTION OF THE INVENTION

An embodiment of the present invention will now be described with reference to the accompanying drawings.

Figure 1:
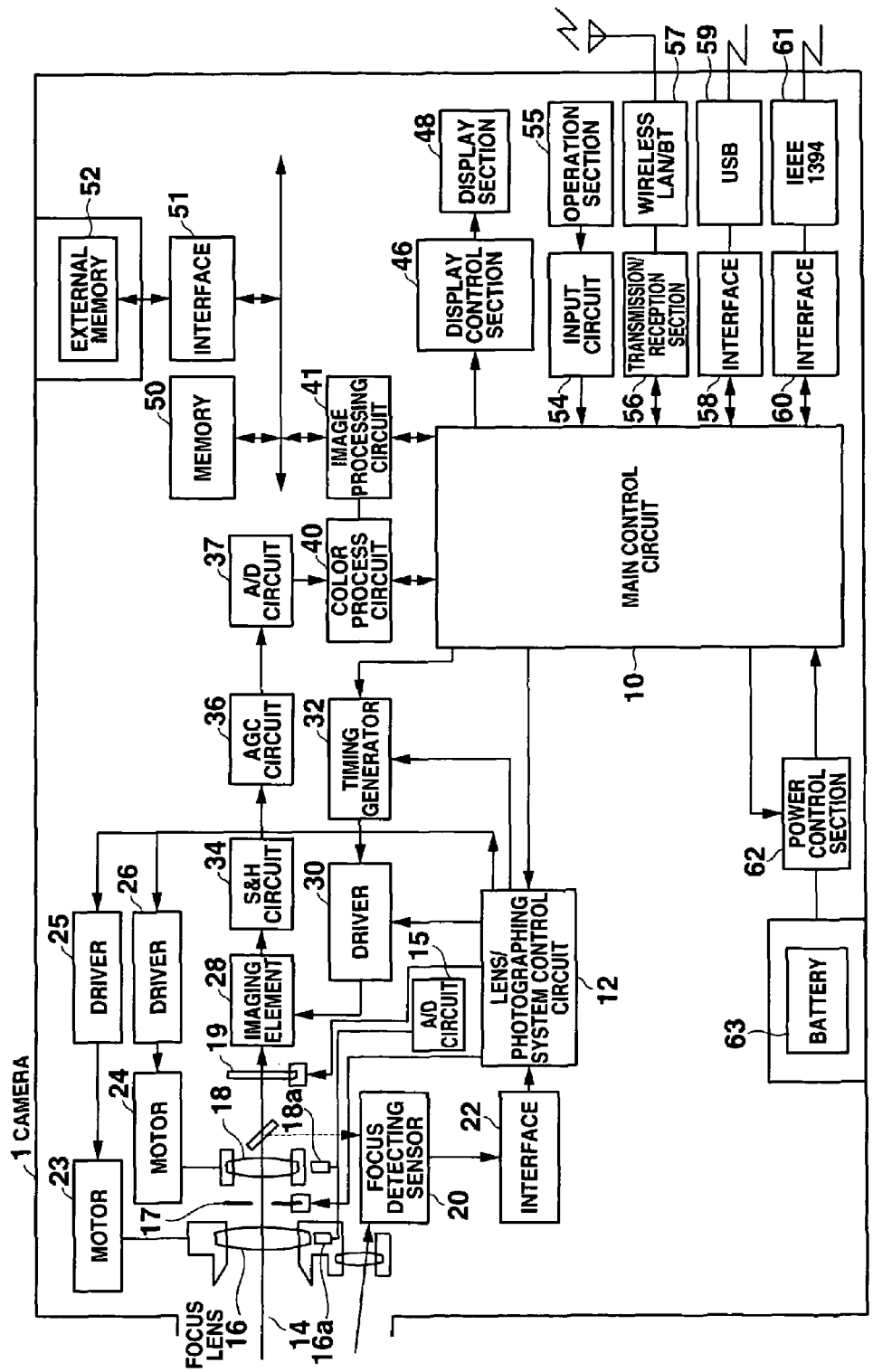
FIG. 1 is a block diagram illustrating the circuit configuration of an electronic camera 1 according to an embodiment of the present invention.

FIG. 1 is a block diagram illustrating the circuit configuration of an electronic camera 1 according to an embodiment of the present invention.

The electronic camera 1 comprises a main control circuit 10 for controlling all structural elements of the camera 1. By controlling the structural elements, the main control circuit 10 photographs, displays and records images and communications with external information devices.

The main control circuit 10 controls functions and determines settings in accordance with instructions entered from input devices of an operation section 55 and supplied through an input circuit 54. The input devices of the operation section 55 include a shutter switch, a zoom button, a dial, a cursor key, a coordinate input section and other types buttons and switches.

The main control circuit 10 controls the elements of the lens and focusing system by means of a lens/photographing system control circuit 12.

The lens/photographing system control circuit 12 drives a focus motor 23 (which is a stepping motor) by use of driver 25 in accordance with signals supplied through an interface 22 from a focus detection sensor 20. By moving the position of the focus lens 16, the lens/photographing system control circuit 12 attains the auto-focus function wherein an object to be photographed is in focus. In addition, the lens/photographing system control circuit 12 drives a zoom motor 24 (which is a stepping motor) by use of driver 26 in accordance with how the zoom button of the operation section 55 is operated. By moving the position of the zoom lens 18, the lens/photographing system control circuit 12 attains the multi-focus telephoto zoom function. When moving the focus lens 16 and the zoom lens 18 simultaneously, the lens/photographing system control circuit 12 supplies the focus motor 23 and the zoom motor with excitation signals at such synchronized timings as prevents phases causing a heavy current load from coinciding with each other.

The lens/photographing system control circuit 12 determines the position of the focus lens 16 on the basis of signals supplied from sensor 16a, such as a photo interrupter or photo reflector. Sensor 16a is provided for detecting the position of the focus lens 16. Likewise, sensor 18a is provided for detecting the position of the zoom lens 18.

The lens/photographing system control circuit 12 is provided with an A/D circuit 15. This A/D circuit 15 receives analog signals which the sensors 16a and 18a output in accordance with lens positions, and converts the received analog signals into digital signals. The A/D circuit 15 enables A/D conversion in the successive scan mode, and sequentially scans (and switches) the channels corresponding to sensors 16a and 18a and performs A/D conversion with respect to the analog signals supplied through the channels. In the successive scan mode, the cycle and channel of the scanner can be determined. The lens/photographing system control circuit 12 compares the value of a digital signal output from the A/D circuit 15 with a reference level corresponding to a predetermined reference position. Based on this comparison, the lens/photographing system control circuit 12 determines the position of the focus lens 16 or zoom lens 18.

Under the control by the main control circuit 10, the lens/photographing system control circuit 12 controls an aperture 17 provided for the lens optical system, and further controls the opening/closing operation of a shutter 19.

The light from the object to be photographed travels through the lens optical system is subject to the scan drive control performed by a timing generator 32 and a driver 30. In accordance with this scan drive control, the light is converted into electric signals by an imaging device 28 such as a charge coupled device (CCD). The electric signals are supplied to a sample and hold (S&H) circuit 34, an auto gain controller (AGC) and an A/D circuit 37, by which the electric signals are converted into digital data suitable for input to a color process circuit 40.

The color process circuit 40 executes color processing (including pixel interpolation processing and γ correction processing) with respect to the digital data supplied from the A/D circuit 37, in such a manner as to generate digital brightness signals Y and color-difference signals Cb and Cr.

Each time the digital brightness signals Y and color-difference signals Cb and Cr corresponding to one frame are output from the color process circuit 40, an image processing circuit 41 processes them in the unit referred to as the basic block (which is defined by 8 pixels (column)×8 pixels (rows)), for data compression. This processing is executed in accordance with the JPEG (Joint Photographic Experts Group) standards, for example, and includes ADCT (Adaptive Discrete Cosine Transform), Huffman coding (which is one kind of entropy coding processing), etc. The image data subject to the image processing by the image processing circuit 41 is stored in a memory 50 (which is a semiconductor memory).

On the basis of the image data supplied from the photographing system (including shutter 19, imaging element 28, sample and hold circuit 34, AGC circuit 36, A/D circuit 37, color process circuit 40, image processing circuit 41), the main control circuit 10 causes a display control section 46 to show an image ("through image") on a display 48 functioning as an LCD finder.

The display control section 46 controls the display 48 (LCD) to show an image on the basis of image data 46a stored in the display memory. Alternatively, the display control section 46 controls the display 48 to show a photographed image on the basis of image data stored in either memory 50 or external memory 52.

The main control circuit 10 can exchange the image data stored in memory 50 or external memory 52 with external devices connected through interface 58 and USB 59 or through interface 60 and IEEE1394 61. The external devices include a personal computer PC, a printer and another electronic camera.

The external memory 52 may be a removable type of memory coupled through a memory slot (not shown). The main control circuit 10 can record image data in such an external memory through interface 51. In addition, the main control circuit 10 can read image data out from such an external memory 50 and store it in memory 50.

The main control circuit 10 can exchange image data or other kinds of data with the external devices not only through interfaces 58 and 60 but also through a transmit/receive section 56 and wireless LAN/BT (Bluetooth) section 57.

The main control circuit 10 is actuated by operating a power supply switch (not shown). The main control circuit 10 controls the amount of power it receives from a battery 63, by means of a power control section 62. The power control section 62 monitors the remaining capacity of the battery 63 by comparing the voltage value of the battery 63 with a predetermined threshold value. If the voltage value of the battery 63 becomes lower than the threshold value, the power control section 62 notifies the main control circuit 10 that the battery 63 becomes weak or dead.

Under the control by the main control circuit 10, a flash driving section (not shown) drives a flash to emit light in response to the operation of the shutter. Where the strobe driving mode is selected, the flash driving section electrically charges a large-capacity flash capacitor (not shown) based on the power supplied from the battery 63 and causes the flash to emit light.

A description will now be given as to how the electronic camera of the embodiment drives the lenses.

The lens/photographing system control circuit 12 of the camera of the embodiment performs a zoom tracking operation so as to move the position of the focus lens 16 simultaneously with the movement of the zoom lens 18. This zoom tracking operation is intended to keep the object in focus despite the zoom operation performed.

Figure 2:
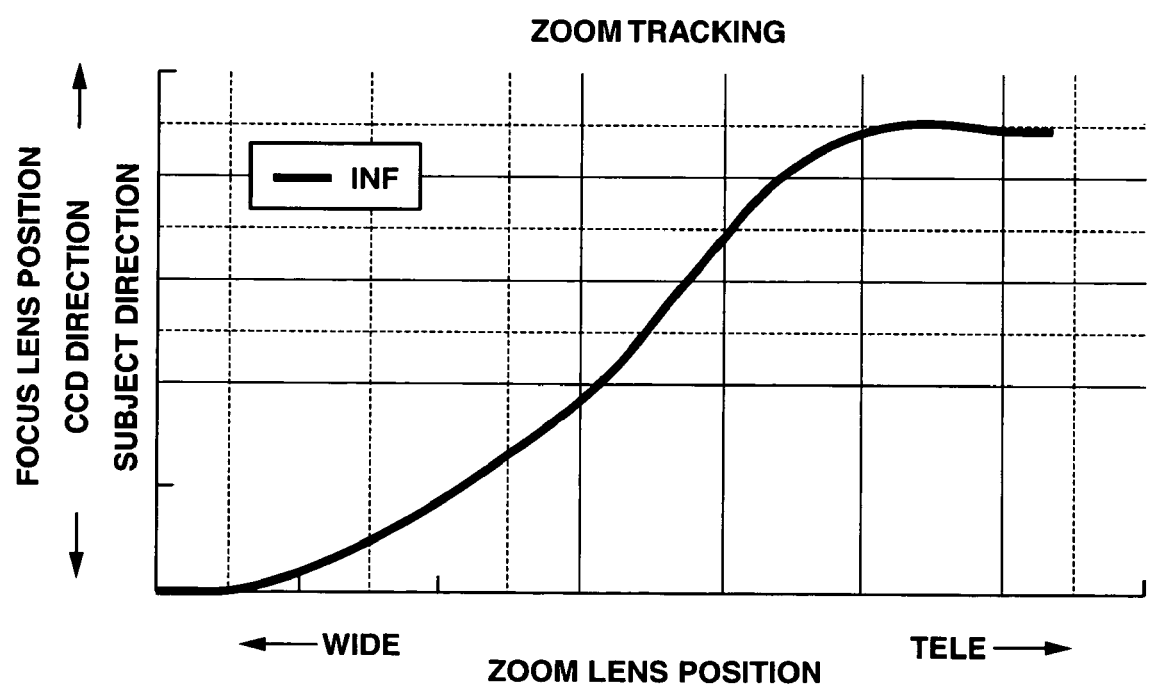
FIG. 2 is an example of a zoom tracking chart.
Figure 3:
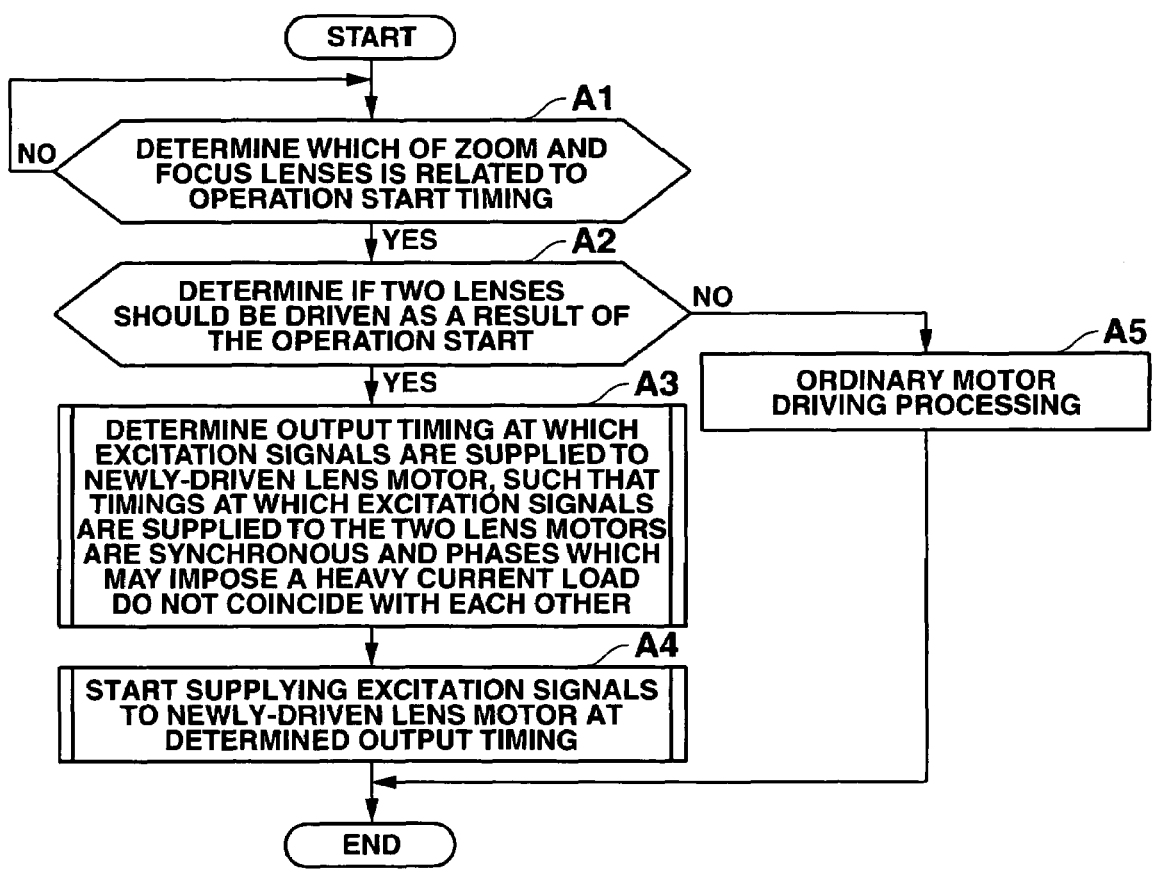
FIG. 3 is a flowchart describing how a motor should be controlled when the focus lens 16 and the zoom lens 18 of the embodiment are moved simultaneously.

The zoom tracking operation is based on the zoom tracking chart shown in FIG. 2. When the zoom lens 18 is moved toward "wide", the focus lens 16 is moved toward the imaging element (CCD) 28. When the zoom lens 18 is moved toward "tele", the focus lens 16 is moved toward the object. As shown in FIG. 2, when the zoom lens 18 is moved to the end of "wide" or to the end of "tele", the distance by which the focus lens 16 is moved relative to the zoom lens 18 is short.

A description will be given as to how the motor is driven when the focus lens 16 and the zoom lens 18 are driven simultaneously.

First of all, the main control circuit 10 determines whether the operation start timing of either the zoom lens 18 or the focus lens 16 comes (Step A1). For example, if the zoom button of the operation section 55 is operated in the photographing mode, an instruction for carrying out the zoom driving is supplied from the input circuit 54.

More specifically, the main control circuit 10 determines whether both the focus lens 16 and the zoom lens 18 have to be driven simultaneously. For example, when the zoom operation is performed in the photographing mode, the focus lens 16 has to be moved in accordance with the movement of the zoom lens 18, so as to keep the object in focus. Where only one of the two lenses is moved, ordinary motor driving processing is executed (Step A5).

The main control circuit 10 causes the lens/photographing system control circuit 12 to drive both the focus lens 16 and the zoom lens 18.

In this case, the lens/photographing system control circuit 12 controls the timings at which excitation signals are supplied to newly-driven lens motors. The timings at which the excitation signals are supplied to the focus motor 23 and the zoom motor 24 are controlled in such a manner that the phases that cause a heavy current load do not coincide with each other (Step A3).

Based on the timings thus controlled, the lens/photographing system control circuit 12 starts supplying excitation signals to the newly-driven motor (Step A4).

FIG. 4 is an excitation timing chart illustrating how the lens/photographing system control circuit 12 excites the focus motor 23 and the zoom motor 24 so as to simultaneously move the focus lens 16 and the zoom lens 18 ([4a] the (1-2)-phase driving of the zoom motor, [4b] the (1-2)-phase driving of the focus motor). FIG. 4 also shows variations in the amount of motor driving current required for driving the focus motor 23 and the zoom motor 24) (use of single-phase current is assumed) ([4c] current ratio).

As shown in FIG. 4, the present embodiment supplies excitation signals to the focus motor 23 and the zoom motor 24 based on the (1-2)-phase driving system. The focus motor 23 and the zoom motor 24 are excited at predetermined timings in response to "A+ phase", "B+ phase", "A− phase" and "B− phase." To enable excitation based on the (1-2)-phase driving system, a 2-phase output (2-phase excitation) for exciting two phases and a 1-phase output (1-phase excitation) for exciting one phase appear alternately.

The lens/photographing system control circuit 12 controls the output timings of excitation signals supplied to the lens motors, in such a manner that the timing of the 1-phase output supplied to the zoom motor 24 and the timing of the 2-phase output supplied to the focus motor 23 coincide with each other and that the timing of the 2-phase output supplied to the zoom motor 24 and the timing of the 1-phase output supplied to the focus motor 23 coincide with each other. In this way, excitation signals are supplied to the focus motor 23 and the zoom motor 24 so that phases causing a heavy current load do not coincide with each other.

As can be seen from this, the 2-phase output which causes an increase in the amount of current when one of the motors is driven and the 1-phase output which causes a decrease in the amount of current when the other motor is driven, are adjusted in output timings and are synchronized with each other. For this reason, even when the focus motor 23 and the zoom motor 24 are simultaneously driven, a uniform amount of current is used for driving the two motors.

As can be seen from the current ratio shown in (4c) of FIG. 4, no peak current is not produced and no sharp voltage drop does not occur, even when both the focus motor 23 and the zoom motor 24 are driven simultaneously. Hence, the battery voltage does not become so low as to lead to the incorrect determination that the battery is dead.

To start (resume) and stop (degauss) the excitation of the stepping motors (focus motor 23 and zoom motor 24), the excited state has to be maintained for a certain length of time. For example, the stepping motors are started by maintaining the output of the last driven state for 10 to 30 ms, and are stopped by maintaining the last output for 10 to 30 ms. Due to the torque relationships, it may happen that the stepping motors cannot be stopped at a position where driving is enabled based on a small amount of current (i.e., a position where a 1-phase output and a 2-phase output coincide with each other).

In such a case, the excitation timings of the two motors are shifted from each other so as to maintain the excited state when the driving is started and when the driving is stopped. After the 1-phase output and the 2-phase output coincide with each other, the simultaneous driving of the motors is started in the manner described above.

FIGS. 5A and 5B are flowcharts illustrating how excitation signals are output when the excitation is started (resumed) in the embodiment.

Either the method illustrated in FIG. 5A or the method illustrated in FIG. 5b can be selected for use.

In the method shown in FIG. 5A, the zoom motor 24 is first moved (driven) to the position corresponding to the 1-phase output, and then the focus motor 23 is moved (driven) to the position corresponding to the 2-phase output. In the state where the 1-phase output and the 2-phase output coincide with each other, excitation signals are supplied to the focus motor 23 and the zoom motor 24 simultaneously (Step B3).

According to this method, an output (1-phase output or 2-phase output) used for starting the operation is predetermined for each of the focus motor 23 and the zoom motor 24. After the focus motor 2 and the zoom motor 24 are moved to the predetermined driving positions, excitation signals are simultaneously output to them.

The zoom motor 24 was described as being moved to the 1-phase output position, and the focus motor 23 was described as being moved to the 2-phase output position. Instead of this configuration, the zoom motor 24 and the focus motor 23 may be moved to the 2-phase output position and the 1-phase output position, respectively.

In the method shown in FIG. 5B, it is first determined whether both the focus motor 23 and the zoom motor 24 are at the 2-phase output positions (Step C1). If this is not the case (for example, if the one of the motors is at the 1-phase output position and the other is at the 2-phase output position) ("NO" in Step C1), excitation signals are simultaneously supplied to the focus motor 23 and the zoom motor 24 (Step C3) in the manner mentioned above.

If it is determined that both the focus motor 23 and the zoom motor 24 are at the 2-phase output positions ("YES" in Step C1), one of the motors is driven (moved) to the 1-phase output position (Step C2). For example, the zoom motor 24 is moved to the 1-phase output position by driving it based on a 2-phase output. Since the focus motor 23 is at the 2-phase output position, excitation signals are simultaneously supplied to the focus motor 23 and the zoom motor 24 in the same manner as described above (Step C3).

In the method shown in FIG. 5B, where the focus motor 23 and the zoom motor 24 are at the 2-phase output positions, one of them is driven base on a 2-phase output to move it to the 1-phase position. Then, simultaneous supply of excitation signals is started.

As can be seen from the above, the excitation timings of the focus motor 23 and the zoom motor 24 are shifted from each other when the driving of the focus motor 23 and the zoom motor 24 is started and when these motors are stationary. By preventing the 2-phase outputs of the focus motor 23 and the zoom motor 24 from coinciding with each other, an increase in the peak current is prevented.

FIGS. 5A and 5B explain the excitation output control performed when the excitation is started (resumed). Excitation output control is performed in a similar manner (the excitation timings of the focus motor 23 and the zoom motor 24 are shifted from each other) when the excitation is stopped (degaussed).

In the above, the excitation timings were described as being controlled when the excited state is maintained for starting or stopping the driving. If the driving direction is reversed during the zoom tracking operation when the focus motor 23 and the zoom motor 24 are driven simultaneously, the phase position can be controlled similarly.

For example, during the zoom tracking operation, there may be a time when the moving direction of the focus lens 16 must be changed in accordance with the movement of the zoom lens 18. In this case, the excited state must be maintained for a certain length of time in order to change the moving direction of the focus lens 16. In such a case, the focus motor 23 and the zoom motor 24 are controlled in such a manner that they do not stop at positions where the phases cause a heavy current load. By so doing, the zoom lens 18 can be moved in the opposite direction without causing an increase in the peak current. For example, when the zoom motor is at a 2-phase position, the focus motor 23 can be moved to a 1-phase position.

A description will now be given of how control is performed for a zoom tracking operation.

In the control described above, reference was made to the case where the focus motor 23 and the zoom motor 24 are driven simultaneously. As shown in FIG. 2, however, the movement of the zoom lens 18 (i.e., the driving of the focus motor 23) and the movement of the focus lens 16 are not proportional to each other. In other words, even if the two motors are driven simultaneously, the focus lens 16 and the zoom lens 18 cannot be moved in such a manner as to satisfy the relationships shown in the tracking chart of FIG. 2.

The electronic camera 1 of the present embodiment moves the focus lens 16 intermittently when the zoom lens 18 is moved continuously. By the intermittent movement, the zoom lens 18 and the focus lens 16 can be moved in such a manner as to satisfy the relationships shown in the tracking chart.

Figure 6:
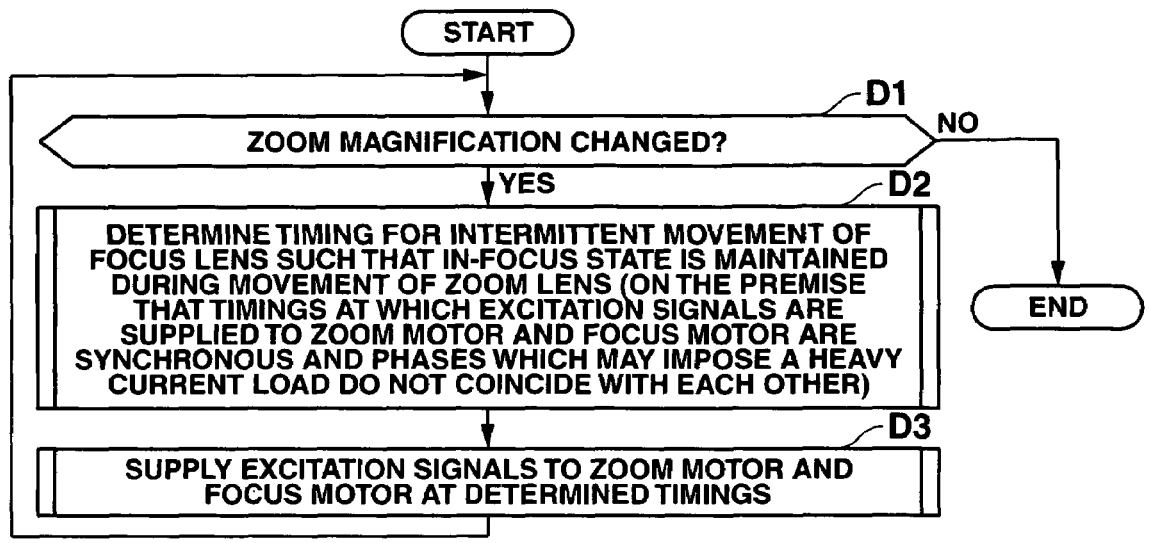
FIG. 6 is a flowchart illustrating the control for performing a tracking operation in the embodiment.

FIG. 6 is a flowchart illustrating the control for performing a tracking operation in the embodiment.

Referring to the flowchart, the main control circuit 10 determines whether the zoom magnification is changed by operating the zoom button of the operation section 55. When it is determined that the zoom magnification has been changed ("YES" in Step D1), the main control circuit 10 controls the lens/photographing system control circuit 12 to move the focus lens 16 and the zoom lens 18.

To be more specific, the lens/photographing control circuit 12 controls the output timings of excitation signals (which are supplied to the focus motor 23 and the zoom motor 24 to move the focus lens 16 and the zoom lens 18) in such a manner as to perform an intermittent operation. In the intermittent operation, the excitation signals supplied to the focus motor 23 and the zoom motor 24 are synchronous but the phases do not cause a heavy current load. To be more specific, the output timing at which the focus motor 23 (which moves the focus lens 16) is intermittently driven is determined in such a manner as to maintain the in-focus state when the zoom lens 18 is moving (Step A3).

At the timing determined in this manner, excitation signals are supplied to the focus motor 23 and the zoom motor 24, for the execution of the zoom tracking control (Step D3).

Figure 7:
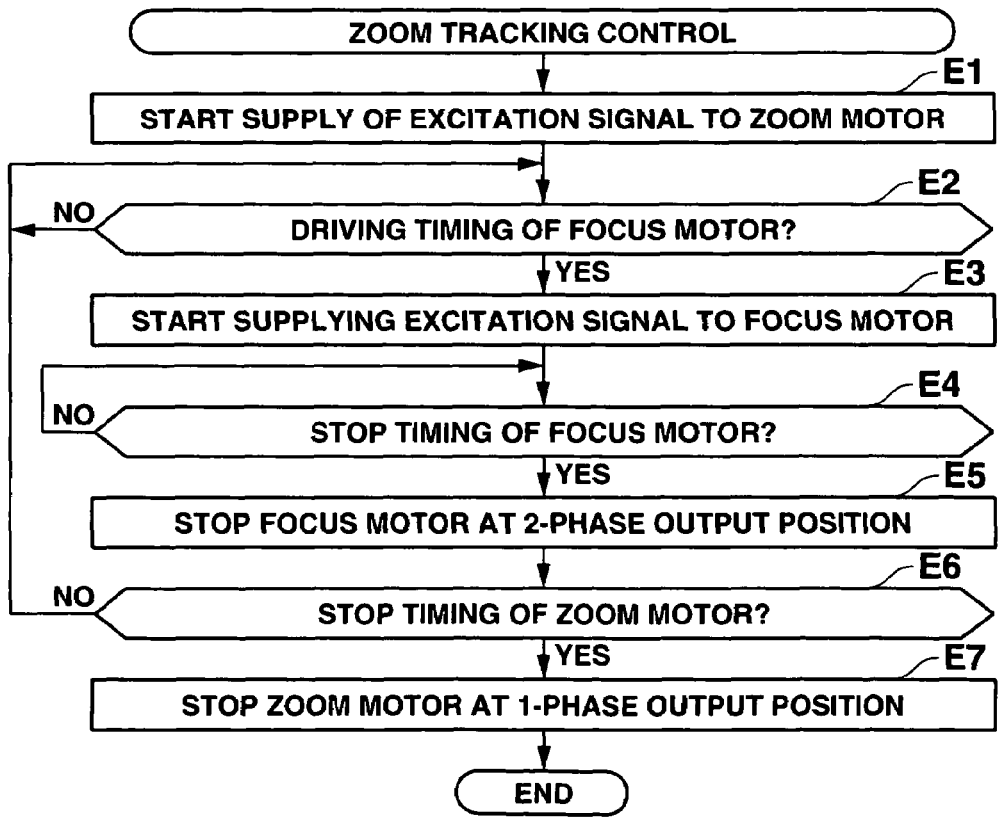
FIG. 7 is a flowchart illustrating the zoom tracking control to be performed in step D3 of FIG. 6.
Figure 8:
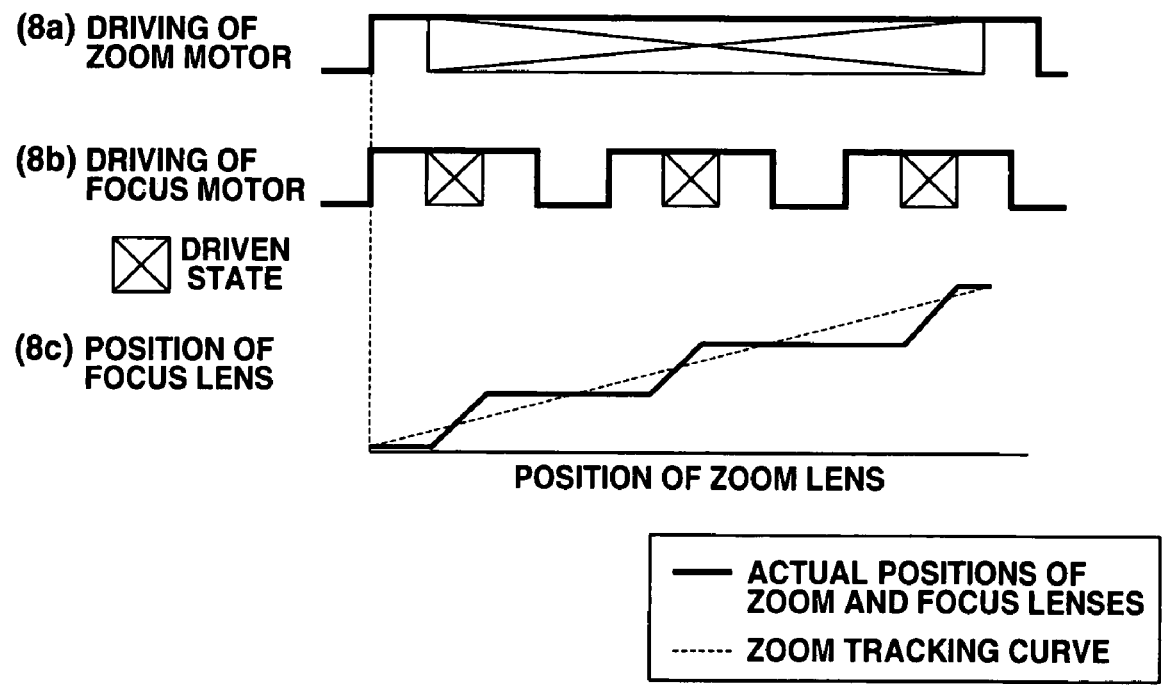
FIG. 8 is a zoom tracking timing chart illustrating the timings when the focus motor 23 and the zoom motor 24 are driven.

FIG. 7 is a flowchart illustrating the zoom tracking control to be performed in step D3 of FIG. 6. FIG. 8 is a zoom tracking timing chart illustrating the timings when the focus motor 23 and the zoom motor 24 are driven.

As shown in FIG. 8, the focus motor 23 is intermittently driven when the zoom motor 24 is successively driven (In FIG. 8, (8a) illustrates how the zoom motor 24 is driven, and (8b) illustrates how the focus motor 23 is driven.). Where the focus motor 23 is driven simultaneous with the zoom motor 24, excitation signals are supplied to the motors at the timings shown in FIG. 4.

The intervals at which the focus motor 23 is intermittently driven are determined in accordance with the position of the zoom lens 18. For example, as shown in FIG. 2, in the case where the zoom lens 18 is at a position close to the "Tele" or the "Wide" side, the moving distance of the focus lens 16 is short, compared to the moving distance of the zoom lens 18. In this case, therefore, the intervals at which the focus motor 23 is driven are long. In accordance with the position of the zoom lens 18, the lens/photographing system control circuit 12 controls the intervals at which the focus motor 23 is driven, in such a manner that the relationships depicted in the zoom tracking chart are satisfied.

Referring to FIG. 7, the supply of excitation signals to the zoom motor 24 is started (Step E1). When the focus motor 23 has to be driven in accordance with the position of the zoom lens 18 (i.e., when the driving timing of the focus motor 23 comes) ("YES" in Step E2), an excitation signal is supplied to the focus motor 23 at timings synchronous to those of the zoom lens 24 and in such a manner that the phases do not cause a heavy current load (Step E3).

The focus motor 23 is driven for a certain length of time. When the stop timing comes ("YES" in Step E4), the focus motor 23 is stopped at a 2-phase output position ("YES" in Step E4), so that it can be driven again.

If the stop timing of the zoom motor 24 has not yet come (Step E6), an excitation signal is output at the next driving timing of the focus motor 23 (Step E2) in the same manner as mentioned above. Thus, the focus motor 23 is driven (Step E3). Since the focus motor 23 is stationary at a 2-phase output position, it is driven again simultaneously with the zoom motor 24 at a 1-phase output timing of the zoom motor 24.

The focus motor 23 is intermittently driven as above. When the step timing of the zoom lens 18 comes ("YES" in Step E6), the zoom motor 24 is stopped at a 1-phase output position so that it can be driven again (Step E7).

By intermittently driving the focus motor 23 in accordance with the movement of the zoom lens 18 in the manner described above, the positions of the zoom lens 18 and the focus lens 16 can be changed, as indicated by the solid lines in FIG. 8 (in which the broken line represents a zoom tracking curve). In FIG. 8, the difference between the zoom tracking curve (represented by the broken line) and the actual positions of the focus lens 16 and zoom lens 18 (represented by the solid lines) corresponds to the degree of focal error. However, this focal error does not become a problem in practice by shortening the intervals at which the focus motor 23 is intermittently driven.

In the flowchart shown in FIG. 7, step E5 is described as a step in which the focus motor 23 is stopped at a 2-phase output position, and step E7 is described as a step in which the zoom motor 24 is stopped at a 1-phase output position. Needless to say, however, the focus motor 23 may be stopped at a 1-phase output position in step E5, and the zoom motor 24 may be stopped at a 2-phase output position in step E7.

In the manner described above, the tracking operation can be performed by simultaneously driving the focus motor 23 and the zoom motor 24 at synchronous timings.

A description will now be given as to how the focus motor 23 and the zoom motor 24 are simultaneously driven when the electronic camera 1 is initialized.

To initialize the electronic camera 1, the focus lens 16 and the zoom lens 18 have to be moved to their initial positions. If the operation of moving the focus lens 17 to its initial position and the operation of moving the zoom lens 18 to its initial position are performed successively, the time required for the initialization of the electronic camera 1 will be long, accordingly. In order to shorten the time for the initializing operation, it is desirable that the focus lens 16 and the zoom lens 18 be moved simultaneously to their initial positions. When the focus lens 16 and the zoom lens 18 are moved simultaneously, they are driven at synchronous timings and in such a manner that the phases do not cause a heavy current load.

Figure 9:
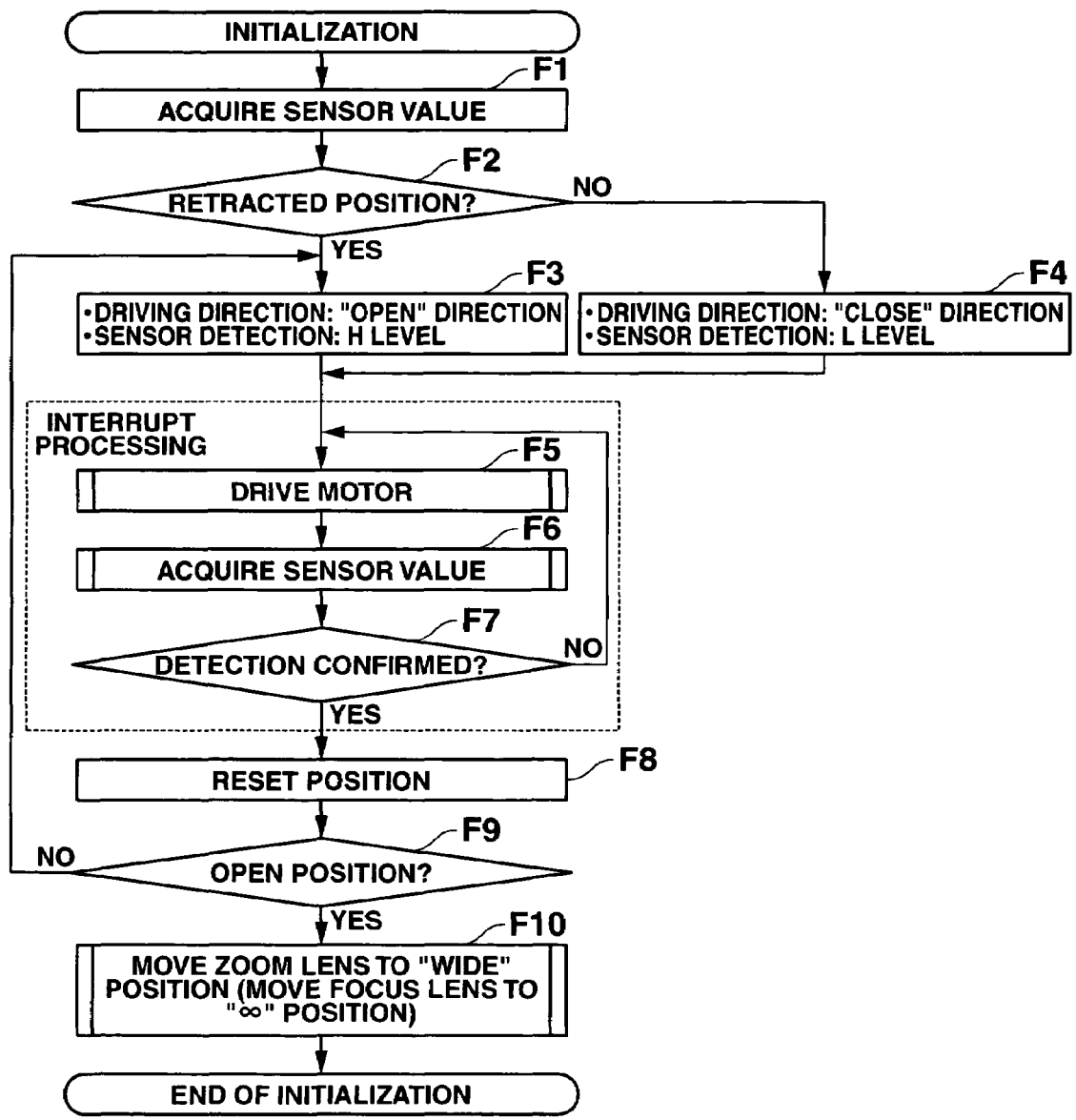
FIG. 9 is a flowchart describing how lenses are initialized in the embodiment of the present invention.

FIG. 9 is a flowchart describing how lenses are initialized.

In the description that follows, how to initialize the zoom lens 18 (i.e., how to move it to its initial position) will be described, but the focus lens 16 is initialized similarly. The lens/photographing system control circuit 12 controls the A/D circuit 15 to regularly acquire signals which are supplied from the sensor 16a of the focus lens 16 and the sensor 18a of the zoom lens 18. Based on the values the sensors 16a and 18a measure, the lens/photographing system control circuit 12 detects the positions of the focus lens 16 and the zoom lens 18. (This detection will be detailed later with reference to FIG. 11.) The A/D circuit 15 is switched to the successive scan mode, sequentially switches the channels corresponding to sensors 16a and 18a, and performs A/D conversion with respect to the analog signals supplied through the channels.

In the initializing processing, the focus lens 17 and the zoom lens 18 are first moved to resetting positions, which are predetermined as reference positions. From the resetting positions, they are moved for a certain distance to the initial positions. The focus lens 17 and the zoom lens 18 can be moved to the initial positions irrespective of the positions they are located when they are driven last time.

When the electronic camera 1 is turned on, and the initializing processing is started, the lens/photographing system control circuit 12 controls the A/D circuit 15 to acquire the sensor value supplied from the sensor 18a (which is used for detecting the position of the zoom lens 18) (Step F1). The lens/photographing system control circuit 12 determines whether the acquired sensor value represents a retracted position of the zoom lens 18 (Step F2).

Where the sensor value represents the retracted position ("YES" in Step F2), the direction in which the zoom lens 18 should be driven to the resetting position is determined as an "open direction", and the detection level the sensor keeps until the zoom lens 18 is moved to the resetting position is set at "H" (high) level (Step F3).

Let us assume that the sensor value of the sensor 18a is small when the zoom lens 18 is at the "closed" position ("retracted" position), and is large when the zoom lens 18 is at the "open" position, as shown in the "(11a) Initialization Timing Chart" of FIG. 11. In this case, the sensor value gradually increases when the zoom lens 18 is moved from the "L" level position (i.e., the retracted position) in the "open" direction. When the sensor value exceeds a comparison level which is predetermined based on the resetting position, it is regarded as "H" level. By detecting this "H" level, the zoom lens 18 is detected as being moved to the resetting position.

Where the sensor value does not represent the retracted position ("NO" in Step F2), the direction in which the zoom lens 18 should be driven to the resetting position is determined as a "close direction", and the detection level the sensor keeps until the zoom lens 18 is moved to the resetting position is set at "L" (low) level (Step F4).

After the driving direction of the zoom lens 18 and the detector level of the sensor are determined in the manner mentioned above, the zoom motor 24 is driven to move the zoom lens 18 in the determined driving direction. In synchronism with the driving timing of the zoom motor 24, the lens/photographing system control circuit 12 acquires the sensor value output from the A/D circuit 15 (Step F6). The timing at which the sensor value is acquired (i.e., the scanning timing of the A/D circuit 15) will be detailed later.

In Step F7, a check is made to see whether the sensor value exceeds the predetermined comparison level (i.e., whether the sensor value is at the predetermined detection level ["H" or "L" level]). The lens/photographing system control circuit 12 keeps driving the zoom motor 24 and moving the zoom lens 18, until it is confirmed that the sensor value has become the predetermined level (Steps F5-F7).

Where it is confirmed that the sensor value has exceeded the comparison level ("YES" in Step F7), the position where the zoom lens 18 is located then is used as a resetting position (Step F8).

Then, a check is made to see whether the zoom lens 18 is at the "open" position or not. Where the zoom lens 18 is at the "open" position ("YES" in Step F9), the zoom motor 24 is driven from the resetting position in a predetermined amount and in a predetermined direction, thereby moving the zoom lens 18 to the initial position (Step F10). For example, the zoom lens 18 is moved to the "Wide" position to end the initializing processing.

If the zoom lens 18 is not at the "open" position (i.e., if the zoom lens 18 is moved from the "open" position in the "close" direction to the resetting position) ("NO" in Step F9), it is driven in the "open" direction to the resetting position. After the zoom lens 18 is set in the same state as described above (Steps F3 to F8), it is moved to the initial position (Step F10).

Like the zoom lens 18, the focal lens 16 is moved first to the resetting position and then to the initial position. With respect to the focus lens 16, the infinity position may be used as an initial value.

In the above description, reference was made to the case where the zoom lens 18 is moved alone. However, there may be a case where both the focus motor 23 and the zoom motor 24 are simultaneously driven in accordance with the activation processing timing charts shown in FIGS. 12-14. To be more specific, there may be a case where the both the focus motor 23 and the zoom motor 24 are simultaneously driven first to the resetting positions (Step F5) and then to the initial positions (Step F10).

Figure 10:
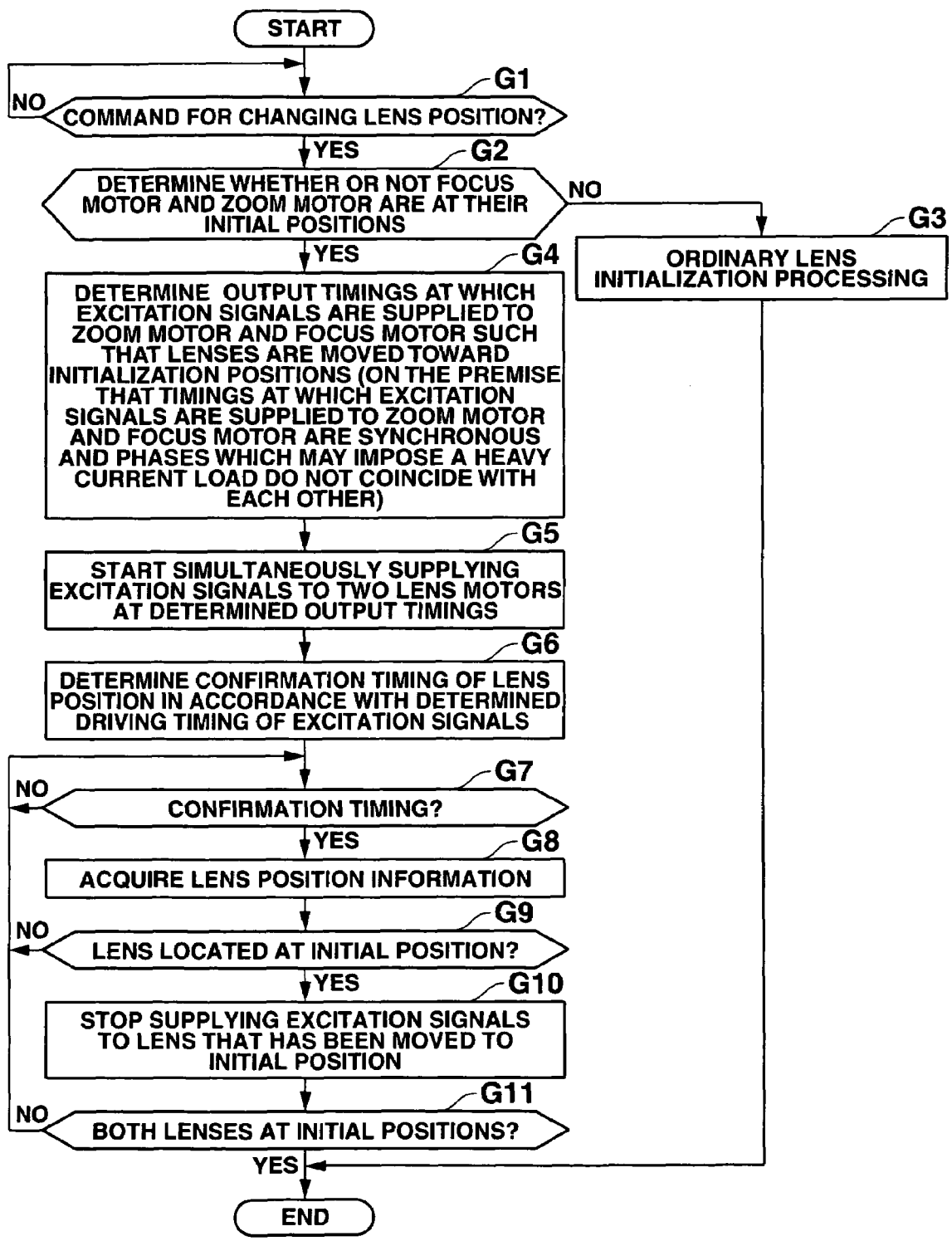
FIG. 10 is a flowchart illustrating the control for simultaneously driving the focus motor 23 and the zoom motor 24 in the initializing processing of the embodiment.

With reference to the flowchart shown in FIG. 10, a description will now be given as to how control is performed when the focus motor 23 and the zoom motor 24 are simultaneously driven in the initializing operation. FIG. 10 illustrates how the focus motor 23 and the zoom motor 24 are driven from the resetting position to the initial position (Step F10).

In the initializing processing, the timing at which the sensor value acquired (i.e., the scanning timing of the A/D circuit 15) is synchronous with the driving timings of the focus motor 23 and the zoom motor 24, as shown in FIG. 11. In FIG. 11, (11a) shows an initialization timing chart, (11b) shows focus driving outputs, and (11c) shows zoom driving outputs. As can be seen from these, the monitoring intervals shown in the initialization timing chart are synchronous with the phases of the excitation signals supplied to the focus motor 23 and zoom motor 24.

More specifically, the A/D circuit 15 acquires a sensor value at regular time intervals in accordance with the driving cycles of the motors, and the sensor value is acquired in synchronism with changes in the lens position. Since sensor values need not be acquired for the purpose of determining the lens position, it is not necessary to make unnecessary determination of the initial positions.

A description will now be given as to how the initializing operation is performed in accordance with the timing chart of the lens initializing processing shown in FIG. 12. In the lens initializing processing shown in FIG. 12, the initializing operation for the zoom lens 18 and the initializing operation for the focus lens 16 are started simultaneously.

When a command to change a lens position is issued ("YES" in Step G1), a check is made to see whether or not the focus motor 23 and the zoom motor 24 are at their initial positions (Step G2). If neither of them is at the initial position ("YES" in Step G2), the timings at which excitation signals are output for simultaneous driving are determined (Step G4). To be more specific, the timings at which excitation signals are supplied to the focal lens 16 and the zoom lens 18 are determined in such a manner that the focus lens 16 and the zoom lens 18 are driven in the initializing direction and the excitation signals for driving the focus lens 16 and zoom lens 18 are output at synchronous timings but the phases do not cause a heavy current load.

At the timings thus determined, the supply of excitation signals to the focus motor 23 and the zoom motor 24 is started in (Step G5). In the lens initializing processing shown in FIG. 12, the focus motor 23 and the zoom motor 24 are simultaneously driven when the zoom motor 24 is started to move toward the "wide" position.

In accordance with the determined supply timing of excitation signals, the confirmation timing at which the lens position is confirmed is determined (Step G6). In other words, the timing at which the A/D circuit 15 acquires a sensor value of the A/D circuit 15 is determined (step G6) (FIG. 11).

When the confirmation timing comes (Step G7), the lens/photographing system control circuit 12 acquires a lens position information (sensor values) by means of the A/D circuit 15 (Step G8), and determines whether the lenses are moved to the initial positions (Step G9).

Where it is determined that the lenses are not moved to the initial positions, lens position information is acquired in the manner mentioned above, so as to determine whether or not the lenses are moved to the initial positions (steps G7-G9).

On the other hand, where it is determined that the lenses are moved to the initial positions ("YES" in Step G9), the supply of excitation signals to the lenses located at the initial positions is stopped (Step G10). In the lens initializing processing shown in FIG. 12, the focus lens 16 is moved to the initial position before the zoom lens 18 is, and the supply of excitation signals to the focus motor is stopped.

In Step G11, a check is made to see whether both the lenses are at their initial positions. If the check shows that both the lenses are not at the initial positions, the lens that is not at the initial position (i.e. the zoom lens 18 in this embodiment) is kept driven (Steps G7 to G11). When it is determined that the lens is moved to the initial position ("YES" in Step G11), the output of excitation signals is stopped, thereby ending the lens initializing processing.

Figure 12:
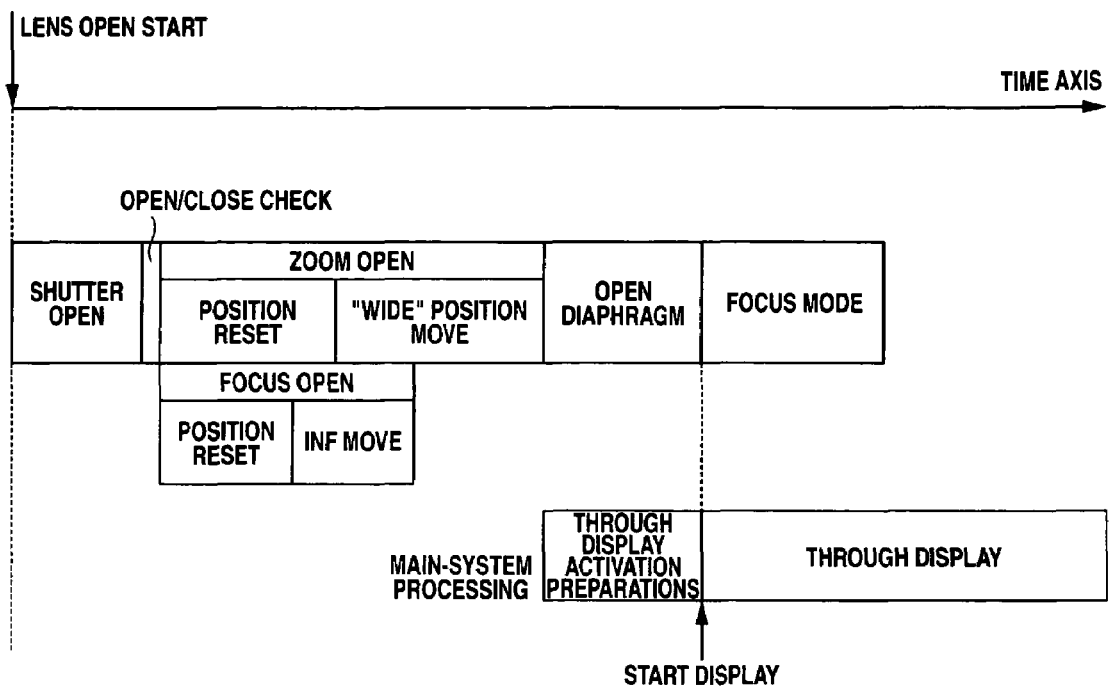
FIG. 12 is a timing chart illustrating an example of the lens initializing processing of the embodiment.

In the manner described above, excitation signals are supplied to the focus motor 23 and the zoom motor 24 in accordance with the timing chart for initialization shown in FIG. 12. The focus lens 16 and the zoom lens 18 are thus moved to their initializing positions simultaneously, thereby shortening the initialization time.

Figure 13:
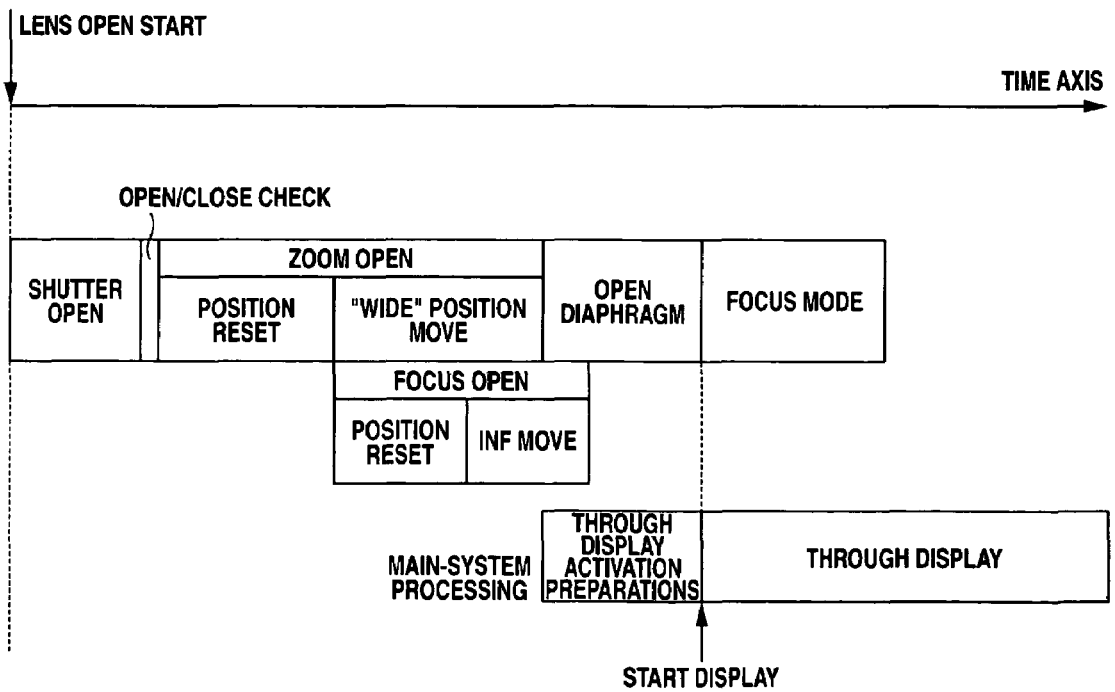
FIG. 13 is a timing chart illustrating another example of the lens initializing processing of the embodiment.

In the initialization processing shown in FIG. 13, the zoom lens 18 is position-reset in its initialization process, and then the initialization processing for the focus lens 16 is started, so as to shorten the initialization processing.

Figure 14:
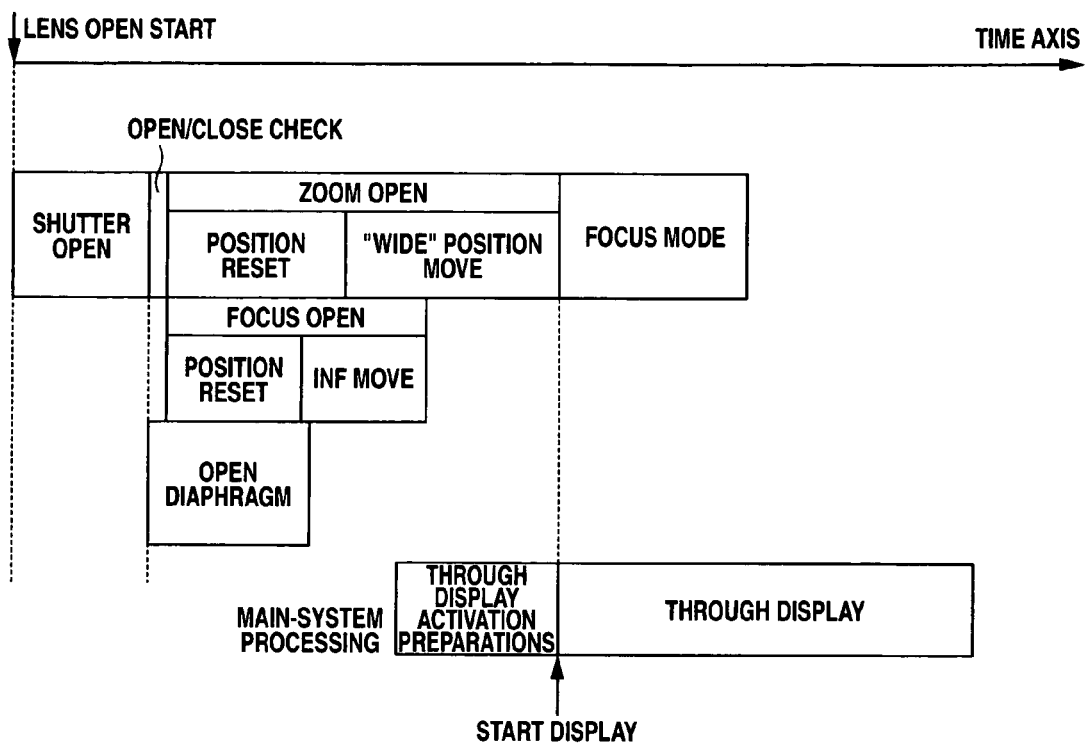
FIG. 14 is a timing chart illustrating still another example of the lens initializing processing of the embodiment.

In the initialization processing shown in FIG. 14, the diaphragm opening processing (diaphragm initialization) is performed immediately after the shutter is opened. In addition to this, the initialization processing for the zoom lens 18 and the initialization processing for the focus lens 16 are executed simultaneously, so as to further shorten the initialization processing.

Figure 15:
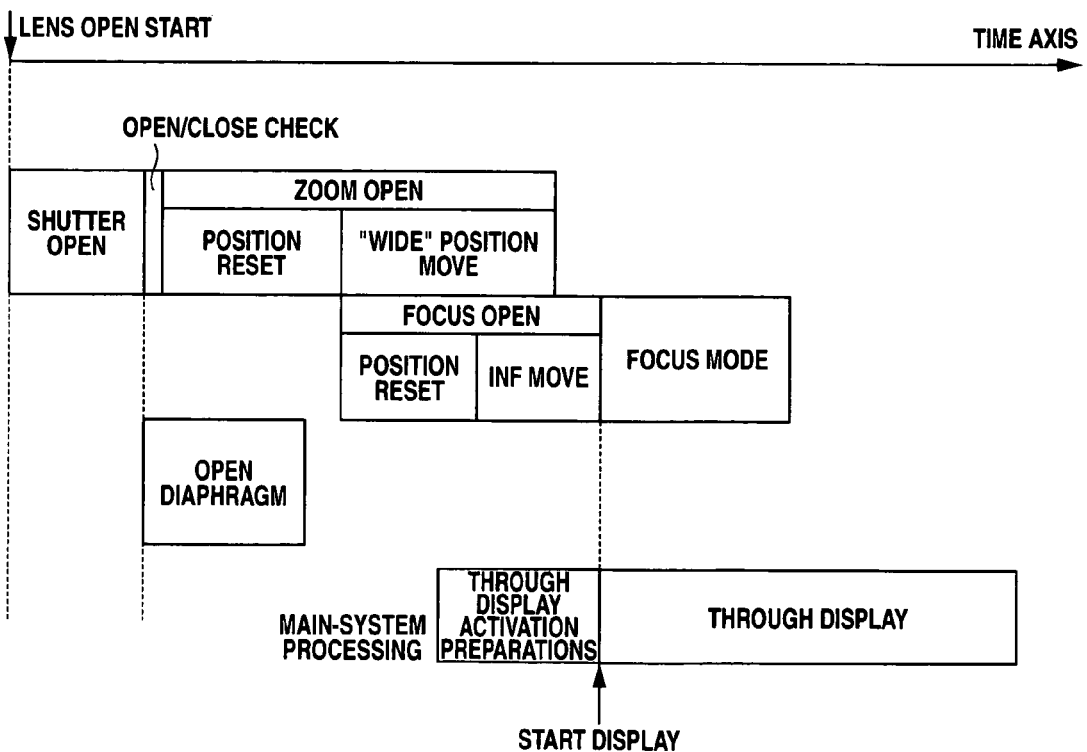
FIG. 15 is a timing chart illustrating a further example of the lens initializing processing of the embodiment.

In the initialization processing shown in FIG. 15, the diaphragm opening processing is performed immediately after the shutter is opened. In addition to this, the zoom lens 18 is position-reset in its initialization process, and then the initialization processing for the focus lens 16 is started, so as to further shorten the initialization processing.

In the initialization processing shown in FIGS. 13-15, the focus motor 23 and the zoom motor 24 are simultaneously driven by outputting excitation signals at timings that are synchronous but do not give rise to phase coincidence that causes a heavy current load. As a result, the motor can be driven by use of a uniform amount of current and yet the timing needed for the initialization processing can be as short as possible.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:
    a first stepping motor configured to move a zoom lens;
    a second stepping motor configured to move a focus lens;
    a first determination unit configured to determine movement timings at which the zoom lens or the focus lens is started;
    a second determination unit configured to determine whether or not the zoom lens and the focus lens are to be simultaneously moved, by checking the movement timings determined by the first determination unit;
    a timing setting unit configured to synchronize output timings of excitation signals output to the first and second stepping motors, when the second determination unit determines that the zoom lens and the focus lens are to be simultaneously moved; and
    an output unit configured to output the excitation signals to the first and second stepping motors in accordance with the output timings synchronized by the timing setting unit;

wherein the timing setting unit determines the output timings such that phases causing a heavy current do not coincide with each other.

2. A camera comprising:
a first stepping motor configured to move a zoom lens;
a second stepping motor configured to move a focus lens;
a first determination unit configured to determine movement timings at which the zoom lens or the focus lens is started;
a second determination unit configured to determine whether or not the zoom lens and the focus lens are to be simultaneously moved, by checking the movement timings determined by the first determination unit;
a timing setting unit configured to synchronize output timings of excitation signals output to the first and second stepping motors, when the second determination unit determines that the zoom lens and the focus lens are to be simultaneously moved; and
an output unit configured to output the excitation signals to the first and second stepping motors in accordance with the output timings synchronized by the timing setting unit;
wherein the output unit outputs the excitation signals with excited state-maintaining timings being shifted from each other, such that the first and second stepping motors are prevented from simultaneously having phases that result in a heavy current load when output of the excitation signals to the first and second stepping motors is started and stopped.

3. The camera according to claim 2, wherein, when a moving direction of the focus lens is reversed, the output unit outputs the excitation signals to the second stepping motor until a heavy current is not applied to the first and second stepping motors, and then stops outputting the excitation signals to the second stepping motor.

4. The camera according to claim 1, wherein the timing setting unit includes an intermittent operation setting unit configured to set timings at which the excitation signals are continuously output to the first stepping motor and timings at which the excitation signals are intermittently output to the second stepping motor, and the output unit includes a zoom tracking unit configured to supply the excitation signals to the first and second stepping motors at the timings determined by the intermittent operation unit.

5. The camera according to claim 1, further comprising:
an initialization execution-determining unit configured to determine whether lens position initialization has been executed; and
a control unit which, when the initialization execution-determining unit determines that the lens position initialization has been executed, controls the output unit to output the excitation signals at the timings determined by the timing setting unit, so as to move the zoom lens and the focus lens to initial positions.

6. The camera according to claim 1, further comprising:
an initialization execution-determining unit configured to determine whether lens position initialization has been executed;
a position determining unit configured to determine whether the zoom lens and the focus lens are at initial positions; and
a control unit which, when the initialization execution-determining unit determines that the lens position initialization has been executed and when the position determining unit determines that one of the zoom lens and the focus lens is at the initial positions, performs ordinary lens initialization processing so as to move the zoom lens and the focus lens to the initial positions.

7. The camera according to claim 6, wherein the position determining unit includes:
a plurality of sensors configured to output analog signals corresponding to positions of the zoom lens and the focus lens;
a single A/D circuit configured to selectively convert the analog signals supplied from the sensors into a digital signal; and
a comparison unit configured to compare a value represented by the digital signal output from the A/D circuit with a comparison level corresponding to a predetermined initial position, so as to determine whether the zoom lens or the focus lens is at the initial positions.

8. The camera according to claim 7, wherein the digital signal output from the A/D circuit is synchronous with the excitation signals output from the output unit.

9. The camera according to claim 5, wherein the control unit simultaneously starts resetting a position of the focus lens and resetting a position of the zoom lens.

10. The camera according to claim 5, wherein the control unit simultaneously starts resetting a position of the focus lens and moving the zoom lens to a "wide" position.

11. The camera according to claim 9, wherein the control unit executes diaphragm opening processing immediately after a shutter is opened.

12. A method for a camera which comprises a first stepping motor configured to move a zoom lens, and a second stepping motor configured to move a focus lens, the method comprising:
determining movement timings at which the zoom lens or the focus lens is started;
determining whether or not the zoom lens and the focus lens are to be simultaneously moved, by checking the determined timings;
synchronizing output timings of excitation signals output to the first and second stepping motors, when it is determined that the zoom lens and the focus lens are to be simultaneously moved; and
outputting the excitation signals to the first and second stepping motors in accordance with the synchronized output timings;
wherein the output timings are determined such that phases causing a heavy current do not coincide with each other.

13. A method for a camera which comprises a first stepping motor configured to move a zoom lens, and a second stepping motor configured to move a focus lens, the method comprising:
determining movement timings at which the zoom lens or the focus lens is started;
determining whether or not the zoom lens and the focus lens are to be simultaneously moved, by checking the determined timings;
synchronizing output timings of excitation signals output to the first and second stepping motors, when it is determined that the zoom lens and the focus lens are to be simultaneously moved; and
outputting the excitation signals to the first and second stepping motors in accordance with the synchronized output timings;
wherein the excitation signals are outputted with excited state-maintaining timings being shifted from each other, such that the first and second stepping motors are prevented from simultaneously having phases that result in a heavy current load when output of the excitation signals to the first and second stepping motors is started and stopped.

14. A computer-readable storage medium having a program stored thereon that is executable by a camera, which comprises a first stepping motor configured to move a zoom lens, and a second stepping motor configured to move a focus lens, the program being executable by the camera to perform functions comprising:

determining movement timings at which the zoom lens or the focus lens is started;
   determining whether or not the zoom lens and the focus lens are to be simultaneously moved, by checking the determined timings;
   synchronizing output timings of excitation signals output to the first and second stepping motors, when it is determined that the zoom lens and the focus lens are to be simultaneously moved; and
   outputting the excitation signals to the first and second stepping motors in accordance with the synchronized output timings;
   wherein the output timings are determined such that phases causing a heavy current do not coincide with each other.

15. A computer-readable storage medium having a program stored thereon that is executable by a camera, which comprises a first stepping motor configured to move a zoom lens, and a second stepping motor configured to move a focus lens, the program being executable by the camera to perform functions comprising:

determining movement timings at which the zoom lens or the focus lens is started;
   determining whether or not the zoom lens and the focus lens are to be simultaneously moved, by checking the determined timings;
   synchronizing output timings of excitation signals output to the first and second stepping motors, when it is determined that the zoom lens and the focus lens are to be simultaneously moved; and
   outputting the excitation signals to the first and second stepping motors in accordance with the synchronized output timings;
   wherein the excitation signals are outputted with excited state-maintaining timings being shifted from each other, such that the first and second stepping motors are prevented from simultaneously having phases that result in a heavy current load when output of the excitation signals to the first and second stepping motors is started and stopped.

* * * * *